March 4, 1930. C. F. BAUER 1,749,206
ROTARY HOE
Filed Jan. 28, 1928 2 Sheets-Sheet 1
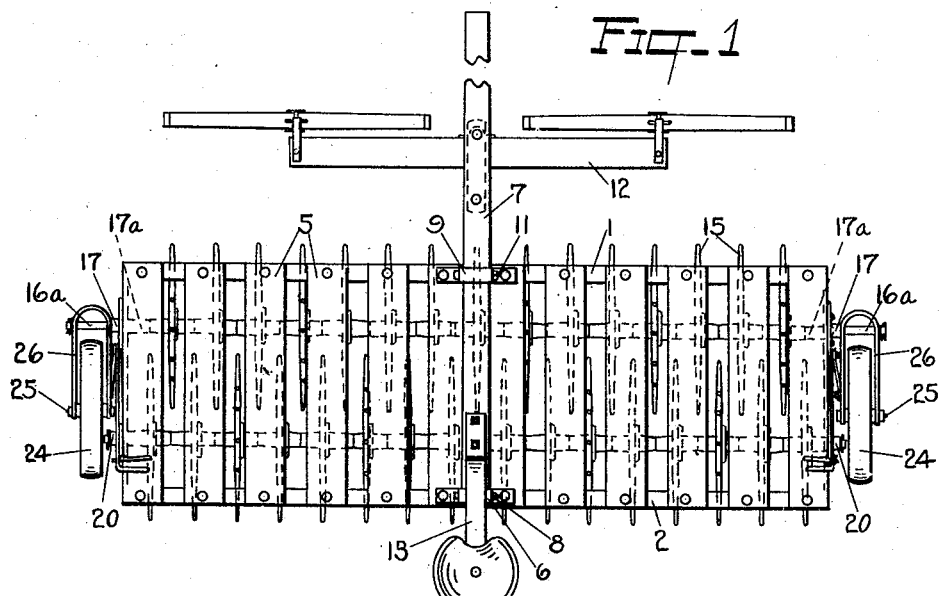
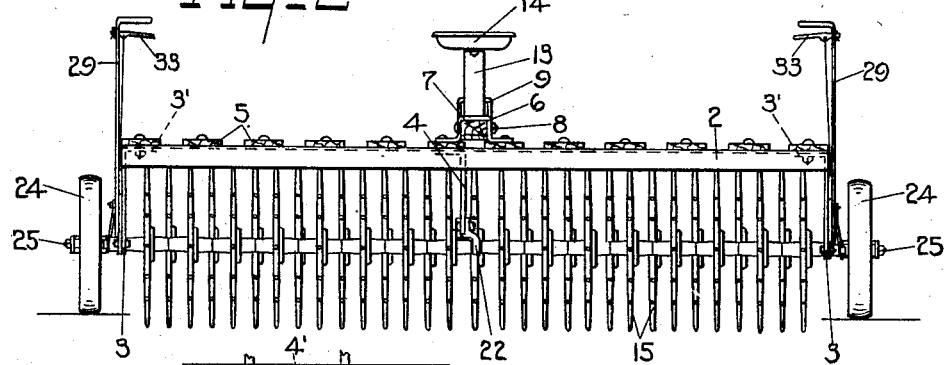
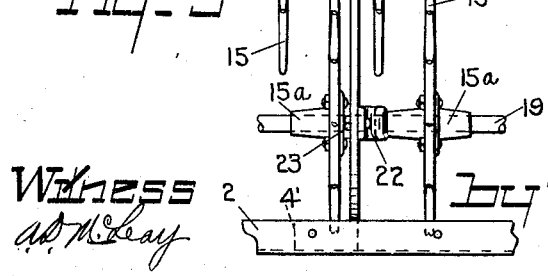

March 4, 1930. C. F. BAUER 1,749,206
ROTARY HOE
Filed Jan. 28, 1928 2 Sheets-Sheet 2
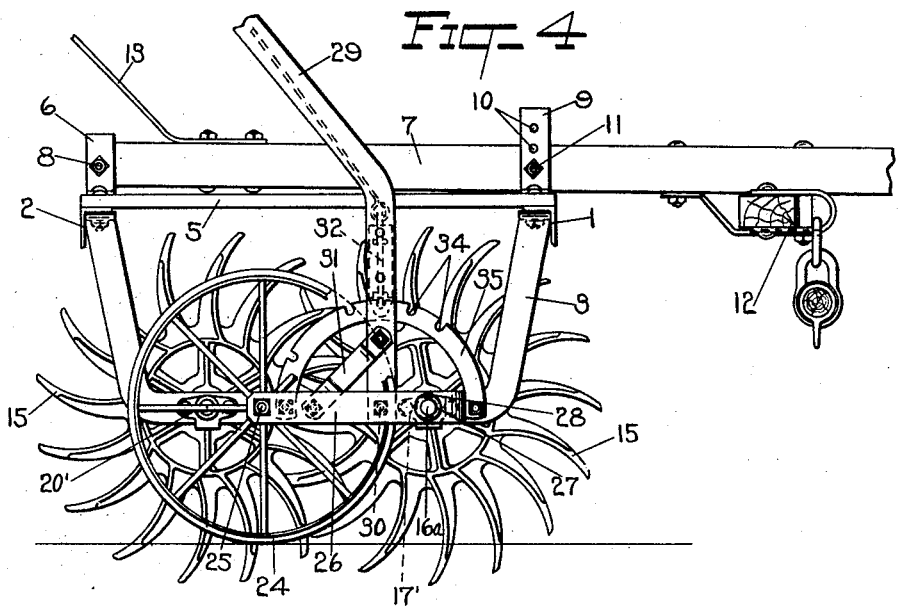
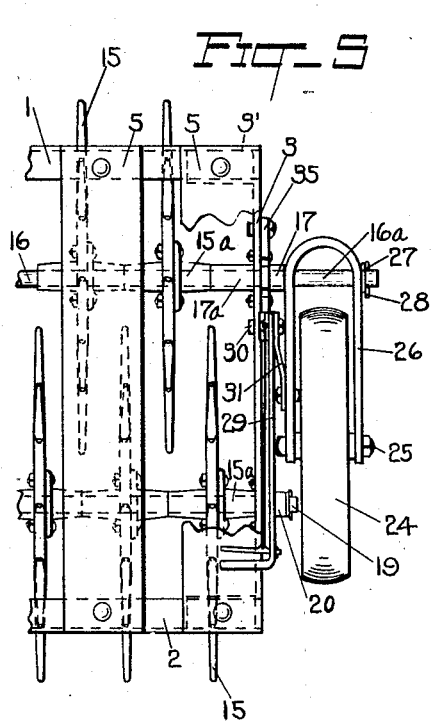
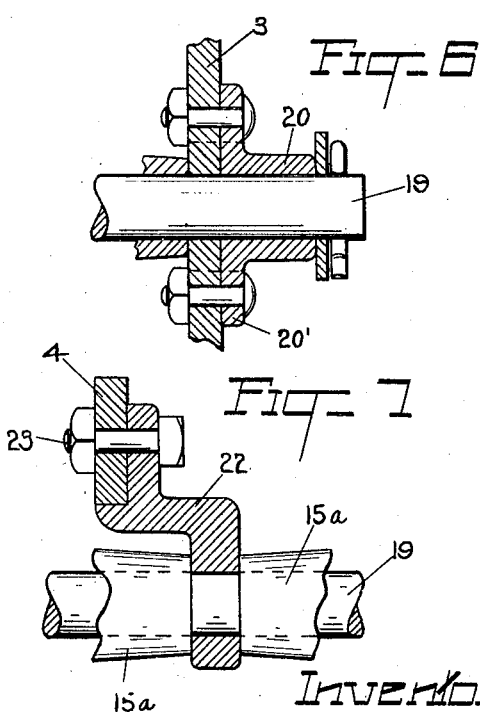
Inventor:
Carl F. Bauer,
By Brown, Jackson, Boettcher & Dienner
Attorneys
Witness
A. D. McKay Patented Mar. 4, 1930

1,749,206

UNITED STATES PATENT OFFICE

CARL F. BAUER, OF ROCK ISLAND, ILLINOIS, ASSIGNOR TO DEERE & COMPANY, OF MOLINE, ILLINOIS, A CORPORATION OF ILLINOIS

ROTARY HOE

Application filed January 28, 1928. Serial No. 250,205.

The present invention relates to that type of cultivating implement commonly referred to as a rotary hoe, such implements being usually characterized by two transversely extending shafts on which closely spaced rotating hoe wheels are mounted, the latter having long, radially extending teeth adapted to enter the soil in the forward rolling motion of the hoe wheels over the ground. Such implements are frequently used in the cultivation of corn and like plants, having particular utility for breaking up crusty soil in the first or second cultivating operations.

Implements of this type are generally provided with adjustable supporting wheels which serve to govern the depth of penetration of the hoe wheels, and which also serve to support the series of hoe wheels at an elevated position, clear of the ground, when the implement is to be transported to or from the field. One of the objects of the invention is to provide an improved mounting for each of these supporting wheels, which will afford a more durable and substantial support for the wheel, and which will enable the construction of the implement to be simplified and cheapened.

Another object of the invention is to provide an improved construction and arrangement of the intermediate bearings for the two shafts on which the hoe wheels are mounted. The wheels on one shaft are usually staggered or offset longitudinally with reference to the wheels on the other shaft, so that the two series of hoe wheels will cultivate along closely spaced lines. This staggered relation of the hoe wheels has heretofore made it difficult to provide intermediate bearing supports for the two shafts, necessitating, for example, that the hoe wheels be separated into laterally spaced gangs to accommodate the intermediate bearings on the shafts, or necessitating the use of specially designed hoe wheels for mounting on the shafts in proximity to the intermediate bearings, such specially designed wheels differing from the other wheels of the implement and thereby necessitating the use of two or more types of wheels. The present construction aims to avoid these objections, the same permitting the hoe wheels to be arranged in substantially uniform spacing across the entire width of the implement, and permitting the use of a single design of hoe wheel at all points in the implement, thereby avoiding the expense and inconvenience of employing wheels of different designs at different points in the implement. The present construction also permits of the use of hoe wheels having relatively long hub members extending therefrom, and preferably on opposite sides thereof, such hub members giving an extended area of support of the wheel on the shaft, which is desirable.

Other objects and advantages of the invention will appear in the following description of a preferred embodiment thereof. In the accompanying drawings illustrating such embodiment:

Fig. 1 is a plan view of the implement.

Fig. 2 is a rear elevational view thereof, illustrating the hoe wheels lowered for a cultivating operation.

Fig. 3 is a detail plan view showing the staggered or offset relation of the intermediate bearings for the two hoe shafts.

Fig. 4 is a side elevational view of the implement.

Fig. 5 is a detail plan view of one side of the implement, illustrating the mounting of one of the supporting wheels.

Fig. 6 is a horizontal sectional view through one of the end bearings for one of the hoe shafts; and Fig. 7 is a vertical sectional view through one of the offset intermediate bearings.

The frame of the implement comprises a transversely extending front angle bar 1 and a transversely extending rear angle bar 2, which angle bars are connected at their ends by longitudinally extending frame members 3, as best shown in Fig. 4. The latter frame members are substantially U-shaped and have horizontally bent flange ends 3' (Fig. 5) which underlie the horizontal flanges of the angle bars 1 and 2, and which are suitably secured thereto. The intermediate portions of the angle bars 1 and 2 are braced by another longitudinally extending frame member 4, which is also U-shaped with laterally bent end portions 4' which are secured to the horizontal flanges of the angle bars. This intermediate frame member is preferably disposed substantially in the center of the implement frame, and the horizontal cross bar portion thereof is preferably located slightly higher than the corresponding portions of the side members 3 for permitting the two hoe shafts to be extended below said intermediate frame member, as will be presently described.

The front and rear angle bars 1 and 2 are also connected together by boards 5 which form a platform upon which weights can be placed to cause the hoe wheels to penetrate the soil to the desired depth, when such weighting of the implement is necessary owing to the hard or crusty condition of the soil. A bracket 6 is connected to the centrally disposed boards 5 and to the rear angle bar 2, such bracket being of inverted U-shaped construction to receive the rear end of a draft pole 7. The draft pole is pivotally connected in the bracket 6 on a bolt 8 which extends through the bracket and through the pole. The draft pole is connected to the front portion of the frame by an inverted U-shaped bracket or stirrup 9, which is secured to the central boards 5 and to the front angle bar 1. The latter bracket is constructed to permit the draft pole to be adjusted vertically therein, the pole in such adjustment pivoting about the rear bolt 8. To support the pole in any of its desired adjustments, the bracket is provided with a series of holes 10 to receive a bolt 11 which is adapted to pass through a transverse opening in the pole 7. Any suitable arrangement of draft devices 12 is connected to the draft pole, preferably on the under side thereof, as best shown in Fig. 4. A seat spring 13 is secured to the upper side of the draft pole, and supports a driver's seat 14.

The soil working devices or rotary hoes consist of wheels 15 having long, pointed teeth adapted to penetrate the ground, as best shown in Fig. 4. The hoe wheels are arranged in front and rear rows or series, with the wheels of one series disposed in staggered or offset relation with respect to the wheels of the other series, as best shown in Figs. 3 and 5. It will also be noted that the two series of wheels overlap each other transversely of the implement. The front series of wheels is mounted on a shaft 16 which extends transversely across the entire width of the implement frame. The end portions of said shaft extend through openings in the side frame members 3, and are supported in bearings 17 which are carried by these frame members. As shown in Fig. 4, the bearings 17 have mounting flanges 17' which are bolted or otherwise secured to the outer sides of the frame members 3. The ends of the shaft 16 project outwardly beyond the extremities of the frame and beyond the bearing members 17, as indicated at 16ᵃ in Fig. 5, for mounting the supporting wheels, as will be presently described. The rear series of hoe wheels is mounted upon a shaft 19 which also extends transversely across the entire width of the implement frame and which has its ends passing through openings in the side frame members 3. The ends of this shaft are supported in bearings 20 which are also provided with laterally extending attaching flanges or ears 20' adapted to be bolted or otherwise secured to the outer sides of the frame members 3, as illustrated in detail in Fig. 6. The shaft 19 is held against endwise displacement from the bearings 20 by any suitable device, such as a cotter pin passing through each end of the shaft.

As previously remarked, the horizontally extending portion of the intermediate frame member 4 is disposed above the front and rear shafts 16 and 19. The two shafts have bearing support on this intermediate frame member through bearing brackets or hangers which depend from the frame member, the bearing member for the front shaft being designated 21, and the bearing member for the rear shaft being designated 22 (Fig. 3). It will be noted that the frame member 4 is disposed in a longitudinal plane between one of the hoe wheels on the front shaft and one of the hoe wheels on the rear shaft. By reason of the fact that the horizontal portion of this frame member is disposed above the plane of the shafts, the frame member proper does not interfere with the shafts nor with the wheels mounted thereon, and such relation of the frame member 4 permits the bearing member 21 to be extended laterally from the frame member to engage the front shaft 16 equidistantly between adjacent hoe wheels mounted thereon, and also permits the bearing member 22 to be extended laterally in the opposite direction to engage the rear shaft 19 between adjacent hoe wheels mounted on this latter shaft. The degree of lateral extension or offset of the two bearing members 21 and 22 thus corresponds to the longitudinal disalinement or offset between the front wheels and the rear wheels. As shown in Fig. 7, each intermediate bearing bracket has a depending arm portion in which is provided a bearing aperture for receiving the hoe shaft. The upwardly extending arm of each bearing bracket has a recess or scarf formed in one side thereof for embracing the side and lower edge of the frame bar 4, such arm being secured to the frame bar by the bolt 23.

Each hoe wheel is mounted upon a relatively long hub 15ᵃ which preferably extends laterally an equal distance from each side of the wheel. Such hub affords an extended area of support for each wheel on its shaft 16 or 19. From the side of the frame to the intermediate portion thereof, the hubs 15' engage directly with each other end to end, and thereby function as spacer members for the hoe wheels. At the intermediate portion of the frame the hubs of the two intermediate hoe wheels on the rear shaft are spaced slightly by the interposition of the bearing bracket 22, the hubs bearing against opposite sides of said bracket, and, correspondingly, the hubs of the two adjacent wheels on the front shaft are spaced slightly by the interposition of the intermediate bearing bracket 21. By reason of the offset relation of these two bearing brackets such spacing occurs between front and rear pairs of wheels which are adjacent to each other, and hence the uniform stagger of all of the wheels across the entire width of the machine, with the rear wheels disposed equidistantly between the front wheels, is not disturbed. Thus all of the hoe wheels used in the construction of the machine are exact duplicates and are interchangeable, thereby avoiding the expense and other objections incident to the use of two or more differently designed wheels in the implement. The wheels at the ends of the rear series preferably have their hubs bearing directly against the inner sides of the lateral frame members 3. The end wheels of the front series have their hubs terminating a slight distance from such frame members, owing to the stagger of the wheels, and such space at each end of the front series is taken up by a spacing member 17$^a$, which preferably constitutes an inward extension of the end bearing 17, although such spacing member may consist of a spool or sleeve mounted on the front shaft between the hub of the end wheel and the inner side of the lateral frame member 3.

For limiting the depth of penetration of the hoe wheels 15, and for transporting the implement to and from the field, supporting wheels 24 are mounted at each side of the implement. Inasmuch as the mounting of these wheels, and the mechanism for adjusting the same, is the same at both sides of the implement, a description of one wheel will suffice for both. Each wheel is mounted upon a pivot pin or axle 25 which extends through the laterally spaced side portions of a U-shaped arm or yoke 26, which affords bearing support for the wheel on each side thereof. The looped or closed end of the yoke shaped arm 26 has alined apertures therein for pivotally mounting the same upon the projecting end portion 16$^a$ of the front hoe shaft. The yoke member is held in place on the extending shaft portion 16$^a$, and against the end of the bearing 17, by a washer 27 and cotter pin 28, the latter extending through the end of the shaft as clearly shown in Fig. 5. The yoke 26 and its wheel 24 is adapted to be swung vertically around the shaft extension 16$^a$ as an axis through the instrumentality of a lever 29, which is pivotally mounted on a bolt or pin 30 carried by the horizontal portion of the U-shaped frame bar 3. The lever 29 is pivotally connected with the yoke or arm 26 by a link 31, so that the yoke is swung upwardly or downwardly by the forward and rearward movement of the lever. The lever is provided with the usual locking dog 32, and with latch mechanism 33 (Fig. 2) for actuating the latter. The locking dog is adapted to cooperate with suitable notches 34 formed in a sector 35 which is suitably secured to the horizontal portion of the lateral frame member 3. When the lever 29 is swung rearwardly, the supporting wheel 24 is rocked downwardly and forwardly relatively to the frame, thereby raising the latter and lifting the hoe wheels out of engagement with the ground. When the levers on both sides of the implement are locked in the rearward notches of the sectors 35, the frame is elevated sufficiently to permit the implement to be transported, with the hoe wheels clear of the ground. When the two levers are swung forwardly the hoe wheels are lowered to come into engagement with the ground, and by rocking the levers to the forward notches of the sectors 35 the weight of the supporting wheels 24 can be added to the weight of the machine for the purpose of forcing the hoe wheels down into hard soil. The supporting wheels can also be adjusted to limit the depth to which the hoes will penetrate the soil in portions of the field where the ground is soft, and by differently adjusting the levers at the opposite sides of the implement, either end of the machine may be raised or lowered to meet the requirements of the unevenness of the ground.

It will be seen from the foregoing that the present construction provides a rotary hoe implement wherein the series of hoe wheels extend entirely from side to side of the machine with a substantially uniform spacing between all of the wheels, and wherein a single type or design of hoe wheel is used throughout the entire implement. It will also be seen that the mounting of the swinging arms for the supporting wheels on the outwardly extending ends of one of the hoe shafts provides a durable, staunch construction which will avoid all tendency of the frame to warp or sag when the hoe wheels are raised to their transport positions. Such will be evident from the fact that the bearing member afforded by the shaft extension 16$^a$ has supporting connection with the frame at both sides thereof, and also with the intermediate portion of the frame through the intermediate bearing bracket 21.

I claim:

1. In a rotary hoe, the combination of a frame, a shaft extending transversely of said frame and having an end portion projecting beyond the side of the frame, a plurality of hoe wheels mounted on said shaft, a U- shaped wheel supporting arm having transversely aligned apertures in the opposite sides of its looped end pivotally supported on the projecting end of said shaft, a supporting wheel mounted between the sides of said arm, and means for swinging said arm to adjust said frame and said supporting wheel vertically relatively to each other.

2. In a rotary hoe, the combination of a frame comprising side frame members, front and rear shafts extending transversely across said frame and supported by said side frame members, hoe wheels mounted on said shafts between said side frame members, one of said shafts having end extensions projecting laterally beyond said side frame members, swinging arms pivotally supported on said shaft extensions at each side of the frame, supporting wheels mounted on said swinging arms, adjusting levers pivotally mounted on said frame, and links operatively connected with said levers and directly connected with said wheels supporting arms for swinging the latter to thereby adjust the relative vertical positions of said frame and said supporting wheels.

3. In a rotary hoe, the combination of a frame comprising front and rear frame bars, U-shaped frame members connected to said bars at the sides of said frame, front and rear shafts extending transversely across said frame and supported by said side frame members, intermediate bearing supports for the intermediate portions of said shafts, a plurality of hoe wheels mounted on said shafts between said side frame members, said front shaft having its ends extending outwardly beyond said side frame members, arms pivotally mounted on said shaft extensions and adapted to swing through an arcuate path in rear of said shaft extensions, supporting wheels pivotally mounted on the swinging ends of said arms, adjusting levers pivotally mounted on each side of said frame, links extending between said adjusting levers and said swinging arms, and latch mechanism for holding said levers in different adjusted positions.

4. In a rotary hoe, the combination of a frame comprising side frame members, front and rear shafts extending transversely across said frame and supported by said side frame members, hoe wheels mounted on said shafts between said side frame members, one of said shafts having extending end portions projecting beyond said side frame members, yoke shaped swinging arms having laterally spaced bearing apertures in the opposite arms of the yoke pivotally mounted on said extending end portions, supporting wheels pivotally mounted in said yoke shaped arms, and lever mechanism for swinging said arms to thereby adjust said frame and said supporting wheels vertically relatively to each other.

5. In a rotary hoe, the combination of a frame comprising side frame members, front and rear shafts extending transversely across said frame and supported by said side frame members, hoe wheels mounted on said shafts between said side frame members, one of said shafts having extending end portions projecting outwardly beyond said side frame members, U-shaped swinging arms having transversely alined apertures in their looped ends pivotally mounted on said shaft extensions, supporting wheels pivotally mounted between the side portions of said U-shaped arms, adjusting levers mounted on said frame adjacent to the sides thereof, and links connecting said levers with said arms.

6. In a rotary hoe, the combination of a frame comprising front and rear frame bars, U-shaped side frame members connected to the ends of said frame bars at each side of the implement, a U-shaped intermediate frame member extending between said frame bars intermediately the sides of the implement, front and rear shafts extending entirely across said frame from side to side thereof and through openings in said side frame members, bearing members mounted on said latter frame members for receiving said shafts, intermediate bearing members mounted on said intermediate frame member and supporting the intermediate portions of said shafts, a series of hoe wheels mounted on each of said shafts and extending continuously across the width of said frame with a substantially uniform spacing between adjacent wheels, the wheels on said rear shaft being staggered with reference to the wheels on said front shaft to be disposed substantially equidistantly therebetween, both series of wheels overlapping transversely of the implement, spacing extensions projecting inwardly from said side bearing members on one of said shafts for spacing the hoe wheels thereon inwardly from said side frame members, one of said shafts having its end portions extending outwardly beyond said side bearing members, U-shaped swinging arms having their looped ends pivotally mounted on said shaft extensions, supporting wheels pivotally mounted between the sides of said U-shaped arms, adjusting levers pivotally mounted on said side frame members, links pivotally connecting said adjusting levers with said swinging arms, latching sectors mounted on each of said side frame members in association with said levers, and latching dogs on said levers adapted to engage said sectors.

7. In a rotary hoe, the combination of a frame, front and rear shafts extending transversely of said frame, bearing means adjacent to the sides of said frame for supporting the end portions of such shafts, a plurality of hoe wheels mounted on said shafts, the wheels on one of said shafts being staggered with reference to the wheels on the other of said shafts, and intermediate bearing supports for said shafts staggered correspondingly with the stagger of said wheels.

8. In a rotary hoe, the combination of a frame, front and rear shafts extending from side to side of said frame, supporting means adjacent to the sides of said frame for supporting the end portions of said shafts, a plurality of hoe wheels mounted on said shafts, the wheels on one of said shafts being offset with reference to the wheels on the other of said shafts, an intermediate support on said frame for supporting the intermediate portion of said front shaft, and an intermediate support on said frame for supporting the intermediate portion of said rear shaft, said intermediate supports being offset laterally with reference to each other.

9. In a rotary hoe, the combination of a frame, front and rear shafts extending transversely of said frame, bearing means adjacent to the sides of said frame for supporting the end portions of said shafts, a series of hoe wheels on each of said shafts extending continuously across the width of the frame with a substantially uniform spacing between adjacent wheels, the wheels on said rear shaft being staggered with reference to the wheels on said front shaft to be disposed substantially equidistantly therebetween, both series of wheels overlapping transversely of the implement, an intermediate bearing support having engagement with said front shaft in one longitudinal plane of the implement, and an intermediate bearing support having engagement with said rear shaft in a different longitudinal plane.

10. In a rotary hoe, the combination of a frame comprising front and rear frame bars, side frame members connecting said bars at the sides of the implement, an intermediate frame member extending between said bars at an intermediate point of the implement, front and rear shafts extending continuously from side to side of the frame, said side frame members comprising bearing supports for the end portions of said shafts, hoe wheels on each of said shafts, the wheels on one of said shafts being staggered with reference to the wheels on the other of said shafts, an intermediate bearing support for one of said shafts projecting laterally from said intermediate frame member, and an intermediate bearing support for the other of said shafts projecting laterally from said intermediate frame member in the opposite direction.

11. In a rotary hoe, the combination of a frame comprising front and rear frame bars, side frame members extending between the ends of said frame bars, front and rear shafts extending continuously from side to side of said frame, bearing supports on said side frame members for mounting the end portions of said shafts, a series of hoe wheels on each of said shafts extending continuously across the width of said frame, with the wheels on said rear shaft staggered with reference to the wheels on said front shaft and overlapping the latter wheels transversely of the implement, all of said hoe wheels being of substantially identical construction, and each wheel comprising a relatively long hub extending from both sides of the wheel, the hubs of adjacent wheels contacting end to end and thereby spacing the wheels on their respective shafts, and two intermediate bearing members depending from said frame bars for supporting the intermediate portions of said front and rear shafts, one of said intermediate bearing members engaging with its shaft between the hubs of adjacent wheels in one longitudinal plane of the implement, and the other intermediate bearing member engaging with its shaft between the hubs of adjacent wheels in another longitudinal plane of the implement.

12. In a rotary hoe, the combination of a frame comprising substantially parallel front and rear frame bars, U-shaped side frame members having their ends secured to the end portions of said frame bars at the opposite sides of the implement, an intermediate frame member of U-shape having its ends secured to said frame bars intermediately the sides of the implement, front and rear shafts extending continuously from side to side of the implement, bearing members mounted on said side frame members for supporting the end portions of said shafts, a series of hoe wheels on each of said shafts extending continuously across the width of said frame, the wheels on said rear shaft being staggered with reference to the wheels on said front shaft to be disposed substantially equidistantly therebetween, both series of wheels overlapping transversely of the implement, all of said wheels being of substantially identical construction and each wheel comprising a relatively long hub extending from both sides of the wheel, the hubs of adjacent wheels contacting end to end and thereby spacing said wheels substantially uniformly across the implement, an angularly shaped bearing bracket secured to one side of said intermediate frame member and projecting laterally therefrom for affording an intermediate bearing support for said front shaft between the hubs of two of its wheels, and a similar bearing bracket secured to said intermediate frame member and projecting laterally in the opposite direction therefrom for affording an intermediate bearing support for said rear shaft between the hubs of two of its wheels.

13. In a rotary hoe, the combination of a frame comprising side frame members, front and rear shafts extending transversely across said frame and having bearing support adjacent to their ends on said side frame members, a series of hoe wheels mounted on each of said shafts between said side frame members, the wheels on one of said shafts being staggered with reference to the wheels on the other of said shafts, one of said shafts having extending end portions extending outwardly beyond said side frame members, swinging arms pivotally mounted on said shaft extensions, supporting wheels pivotally mounted on said swinging arms, lever means for swinging said arms to adjust said frame and said supporting wheels vertically relatively to each other, and intermediate bearing supports for said shafts staggered correspondingly with the stagger of said wheels.

In witness whereof, I hereunto subscribe my name this 21st day of January, 1928.

CARL F. BAUER.